(12) United States Patent
Jung et al.

(10) Patent No.: US 7,465,780 B2
(45) Date of Patent: Dec. 16, 2008

(54) POLYIMIDE COMPRISING SULFONIC ACID GROUP AT THE TERMINAL OF SIDE CHAIN, AND POLYMER ELECTROLYTE AND FUEL CELL USING THE SAME

(75) Inventors: Myung-sup Jung, Seongnam-si (KR); Do-yun Kim, Daejeon-si (KR); Min-ju Jeong, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 374 days.

(21) Appl. No.: 11/052,249

(22) Filed: Feb. 8, 2005

(65) Prior Publication Data

US 2005/0181257 A1    Aug. 18, 2005

(30) Foreign Application Priority Data

Feb. 17, 2004    (KR) .................... 10-2004-0010399

(51) Int. Cl.
  *C08G 69/26*    (2006.01)
  *C08G 73/02*    (2006.01)
  *C08G 73/10*    (2006.01)
  *C08G 73/06*    (2006.01)
  *C08G 69/48*    (2006.01)

(52) U.S. Cl. .................... 528/310; 528/312; 528/313; 528/314; 528/317; 528/350; 528/353; 528/356; 528/364; 528/480; 528/481; 528/482; 528/483; 525/421; 525/422

(58) Field of Classification Search ............. 430/270.1; 528/310
See application file for complete search history.

(56) References Cited

U.S. PATENT DOCUMENTS

| 2003/0035991 A1* | 2/2003 | Colombo et al. | 429/33 |
| 2004/0096773 A1* | 5/2004 | Jung et al. | 430/270.1 |
| 2004/0097695 A1* | 5/2004 | Yoon | 528/350 |

OTHER PUBLICATIONS

Encylclopedia of Polym Sci and Tech , "Polyimides", p. 19, 2002, Wiley and Sons, 2002.*

* cited by examiner

*Primary Examiner*—Rabon Sergent
*Assistant Examiner*—Gregory Listvoyb
(74) *Attorney, Agent, or Firm*—H.C. Park & Associates, PLC

(57) ABSTRACT

The present invention is related to a polyimide, which has high ionic conductivity and good structural stability, does not decompose even under low humidity, and is inexpensive, and a polymer electrolyte and a fuel cell using the same. In particular, the polyimide of the present invention has a repeating unit of Formula (1) below and also includes a reactive blocking group derived from a monoamine compound or monoanhydride compound having at least one carbon-carbon double bond at a terminal or at both terminals:

Formula 1

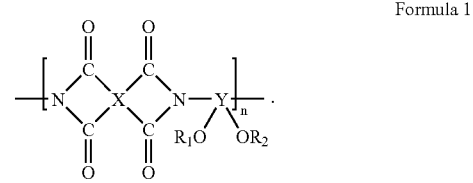

13 Claims, 4 Drawing Sheets

POLYIMIDE COMPRISING SULFONIC ACID GROUP AT THE TERMINAL OF SIDE CHAIN, AND POLYMER ELECTROLYTE AND FUEL CELL USING THE SAME

CROSS-REFERENCE TO RELATED APPLICATIONS

This application claims the benefit of Korean Patent Application No. 10-2004-0010399, filed on Feb. 17, 2004, in the Korean Intellectual Property Office, the disclosure of which is incorporated herein in its entirety by reference.

FIELD OF THE INVENTION

The present invention is related to a polyimide comprising a sulfonic acid group at the terminal of a side chain, and a polymer electrolyte and a fuel cell using the same. Specifically, the polymer of the present invention comprises a terminal sulfonic acid group, which has high ionic conductivity and good structural stability, does not decompose under low humidity, and is relatively inexpensive. Additionally, the present invention is related to a polymer electrolyte and a fuel cell using the same.

BACKGROUND

Fuel cells are new energy storing systems in which chemical energy is converted into electrical energy through electrochemical reactions of fuel and oxygen. Since they are not based on the Carnot cycle, they are potential cleaner energy sources that have higher theoretical power generation efficiency than sources of energy using fossil fuels. Additionally, fuel cells do not discharge a significant amount of environmental contaminants. Such fuel cells can be used as power sources for small electric/electronic devices, particularly portable devices, as well as for industrial, domestic, and transportation applications.

Fuel cells can be classified into molten carbonate fuel cells which operate at higher temperatures of approximately 500° C. to 700° C., phosphoric acid electrolyte cells which operate at approximately 200° C., and alkaline electrolyte fuel cells and polymer electrolyte membrane (PEM) fuel cells which operate at room temperature or at approximately 100° C. The working temperatures and constituent materials of fuel cells are determined by the type of electrolyte used in a cell.

Depending upon how the fuel is supplied to the anode, fuel cells can be classified into an external reformer type where fuel is supplied to the anode after being converted into a hydrogen enrichment gas by a fuel reformer, and a direct fuel supply type or internal reformer type where fuel in gaseous or liquid state is directly supplied to the anode.

An example of direct liquid fuel supply type fuel cells is a direct methanol fuel cell (DMFC). DMFCs generally use an aqueous methanol solution as a fuel, and a polymer electrolyte membrane with hydrogen ionic conductivity as an electrolyte. Since DMFCs do not require an external reformer and use fuel that is convenient to handle, they have the highest potential for use as portable energy sources.

Electrochemical reactions occurring in a DMFC are as follows: fuel is oxidized at the anode, and oxygen is reduced into water through a reaction with hydrogen ions at the cathode.

Anode Reaction: 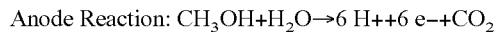

Cathode Reaction: 

Overall Reaction: 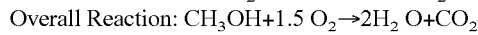

As shown above, one methanol molecule reacts with one water molecule at the anode, to produce one carbon dioxide molecule, six hydrogen ions, and six electrons. The produced hydrogen ions migrate to the cathode through a polymer electrolyte membrane where they react with oxygen and electrons, which are supplied via an external circuit, to produce water. Summarizing the overall reaction in the DMFC, water and carbon dioxide are produced through the reaction of methanol with oxygen. As a result, a substantial part of the energy equivalent to the heat of combustion of methanol is converted into electrical energy.

The polymer electrolyte membrane with hydrogen ionic conductivity acts as a path for the hydrogen ions generated through the oxidation reaction at the anode to migrate to the cathode, and as a separator between the anode and the cathode. The polymer electrolyte membrane requires sufficiently high ionic conductivity to facilitate a rapid migration of a large number of hydrogen ions, electrochemical stability, and mechanical strength suitable for a separator, thermal stability at working temperature, ease of processing into a thin film so that its resistance to ionic conduction can be lowered, and a non-swelling property when permeated by liquid.

Fluorinated polymer membranes such as Nafion (Dupont, Wilmington, Del.), Assiflex (Asahi Chemicals, Japan), and Flemion (Asahi Glass, Japan) are currently available polymer membranes for a fuel cell. These fluorinated polymer membranes operate relatively well at low temperatures, but lose water contained therein at higher temperatures of at least 130° C., thereby causing destruction of an ion channel structure which affects ionic conductivity. In the case of DMFC, methanol leakage through the membrane occurs and its practicality is low. Also, due to its high costs, the fluorinated polymer membrane is difficult to commercialize.

There has been intensive research aimed at developing a less expensive polymer membrane than Nafion, such as a trifluorostyrene copolymer disclosed in U.S. Pat. No. 5,422, 411 in order to overcome these disadvantages. However, the less expensive polymer membrane has poor mechanical properties and film forming ability.

Additionally, U.S. Pat. No. 6,245,881 also discloses various sulfonated polyimides prepared by copolymerizing diamine monomers containing a sulfonic group. These sulfonated polyimides have thermal stability and oxidation/reduction stability much higher than polymeric materials of conventional ion exchange membranes. However, the diamine monomers containing a sulfonic group are restricted and are not well dissolved in general solvents except for m-cresol. In addition, a degree of polymerization is low due to its relatively low reactivity, and thus the formation of a film does not smoothly occur.

SUMMARY OF THE INVENTION

The present invention is directed to a polyimide comprising a reactive blocking group at a terminal, which has high ionic conductivity, good mechanical properties, and good thermal properties. Additionally, the present invention is directed to a polymer electrolyte and a fuel cell using the same.

According to an aspect of the present invention, a polyimide having a repeating unit of Formula (1) below and also comprising a reactive blocking group derived from a monoamine compound or monoanhydride compound having at least one carbon-carbon double bond at a terminal or at both terminals is provided.

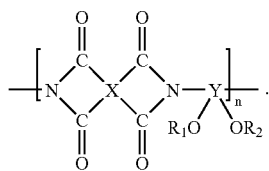
Formula 1 where X may be

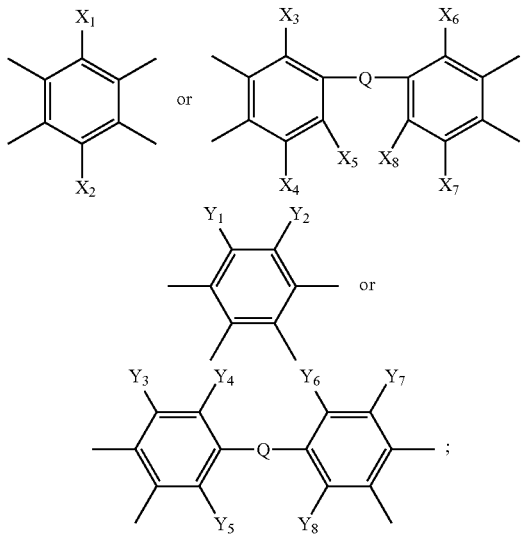

Y may be

X1, X2, X3, X4, X5, X6, X7, X8, Y1, Y2, Y3, Y4, Y5, Y6, Y7, and Y8 may independently be a hydrogen, a halogen, a C1-C30 alkyl group and alkyl halide group, and a C6-C30 aryl group and aryl halide group, for example;

Q may be a chemical bond or may include a group, such as —O—, —CO—, —SO2—, —S—, -(T)a-, —(OT)a-, -(TO)a-, and —(OTO)a- (where T may be an alkylene group substituted with at least one group comprising a halogen and a C1-C10 alkyl halide group or an arylene group substituted with at least one group comprising a halogen and a C1-C10 alkyl halide group, a may be an integer in the range of about 1 to about 10);

R1 and R2 may independently be H or a monovalent organic group of Formula (2) below, but with the proviso that both R1 and R2 are not H; and m may be an integer in the range of about 10 to about 1000:

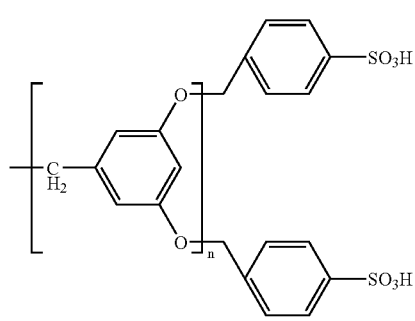
Formula 2 where n may be an integer in the range of about 1 to about 5.

According to another aspect of the present invention, there is provided a polymer electrolyte prepared by curing the above polyimide.

In another aspect, a polymer electrolyte may be prepared by curing a mixture of the polyimide described above and a polyamic acid having a repeating unit of Formula (6) below and also comprising a reactive blocking group derived from a monoamine compound or monoanhydride compound having at least one carbon-carbon double bond at a terminal or at both terminals.

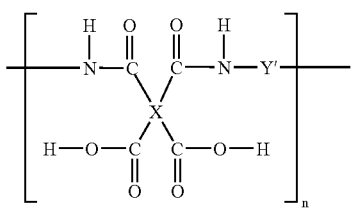
Formula 6 where X is

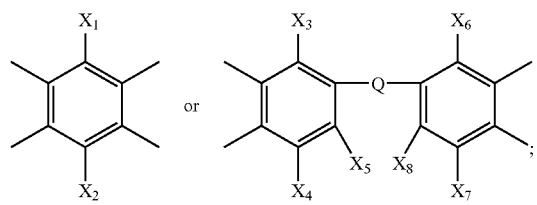

Y' is

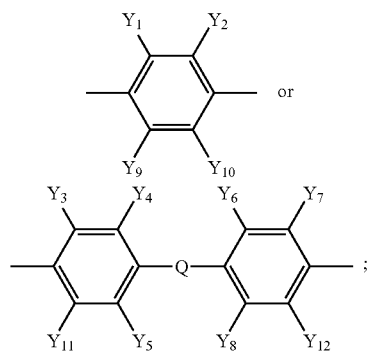

X1, X2, X3, X4, X5, X6, X7, X8, Y1, Y2, Y3, Y4, Y5, Y6, Y7, Y8, Y9, Y10, Y11, and Y12 may independently be a hydrogen, a halogen, a C1-C30 alkyl group and alkyl halide group, and a C6-C30 aryl group and aryl halide group, for example;

Q may be a chemical bond or a group such as —O—, —CO—, —SO2—, —S—, -(T)a-, —(OT)a-, -(TO)a-, and —(OTO)a- (where T may be an alkylene group substituted with at least one group comprising a halogen and a C1-C10 alkyl halide group or an arylene group substituted with at least one group such as a halogen and a C1-C10 alkyl halide group, for example, a may be an integer in the range of about 1 to about 10); and n may be an integer in the range of about 10 to about 1000.

In a further aspect, a polymer electrolyte may be prepared by curing a mixture of the polyimide described above and a soluble polyhydroxyimide comprising a repeating unit of Formula (7) below and also including a reactive blocking group derived from a monoamine compound or monoanhydride compound having at least one carbon-carbon double bond at a terminal or at both terminals.

Formula 7

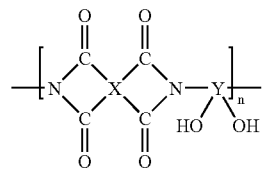

where X may be

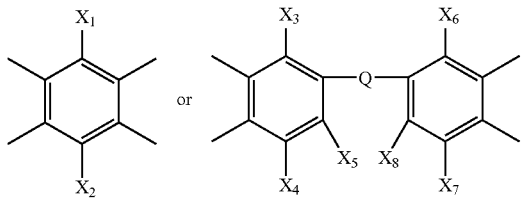

Y may be

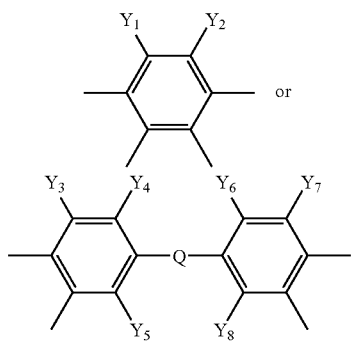

X1, X2, X3, X4, X5, X6, X7, X8, Y1, Y2, Y3, Y4, Y5, Y6, Y7, and Y8 may independently be a hydrogen, a halogen, a C1-C30 alkyl group and alkyl halide group, and a C6-C30 aryl group and aryl halide group, for example;

Q may be a chemical bond or a group including, but not limited to, —O—, —CO—, —SO2-, —S—, -(T)a-, —(OT)a-, -(TO)a-, and —(OTO)a- (where T may be an alkylene group substituted with at least one group including, for example, a halogen and a C1-C10 alkyl halide group or an arylene group substituted with at least one group such as a halogen and a C1-C10 alkyl halide group, a may be an integer in the range of about 1 to about 10); and m may be an integer in the range of about 10 to about 1000.

An additional aspect of the present invention is directed to a fuel cell including the above polymer electrolyte. The fuel cell comprising the polymer electrolyte of the present invention does not exhibit much swelling, has a high ionic conductivity even under low humidity, and good electrical and mechanical properties.

DETAILED DESCRIPTION OF THE INVENTION

Figure 1:
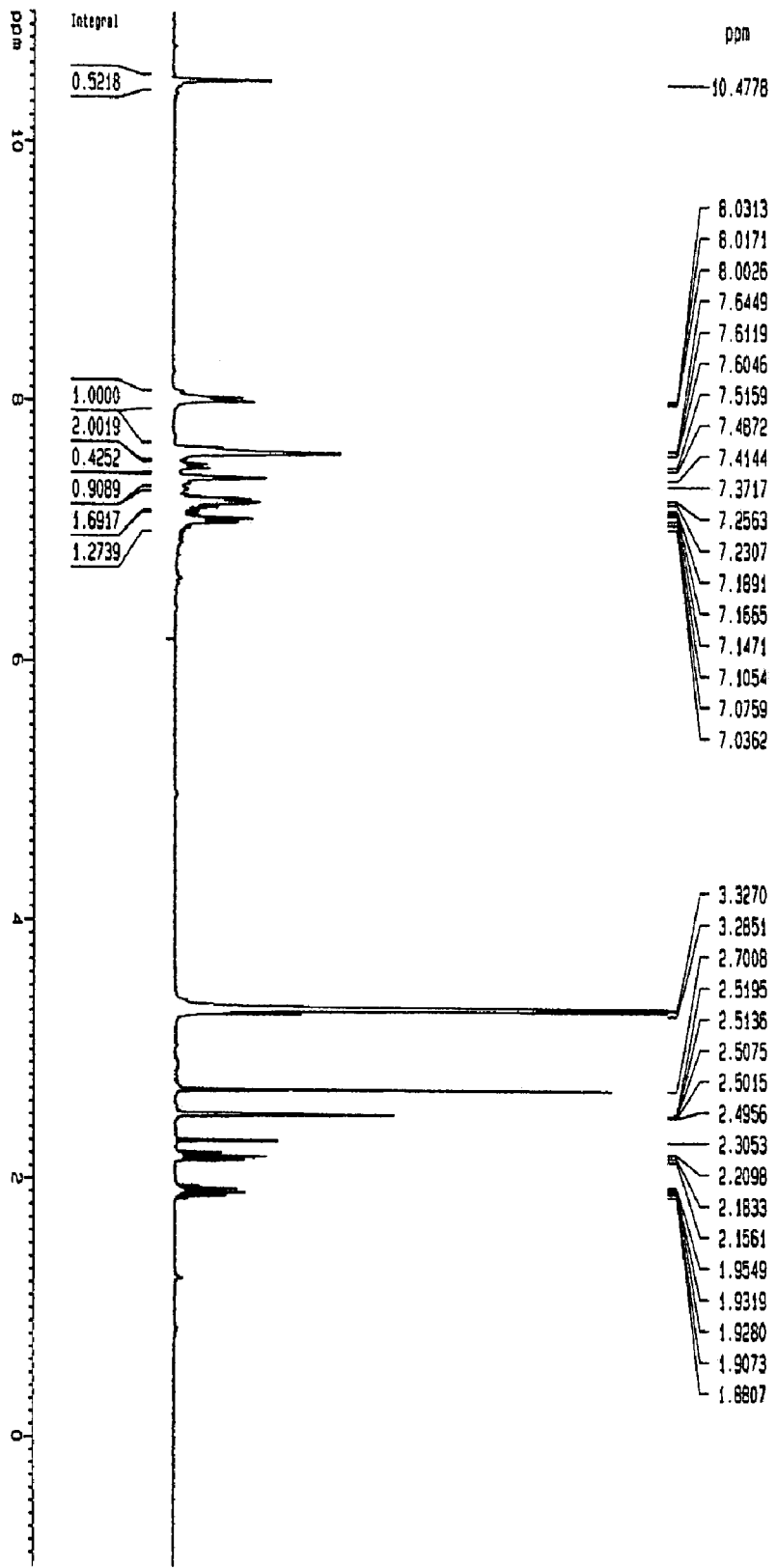
FIG. 1 is an NMR spectrum of a soluble polyhydroxyimide prepared in Example 2.

According to an embodiment of the present invention, a polyimide comprises a repeating unit of Formula (1) below and also includes a reactive blocking group derived from a monoamine compound or monoanhydride compound having at least one carbon-carbon double bond at a terminal or at both terminals.

Formula 1

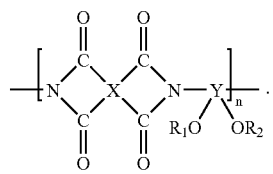

where X may be

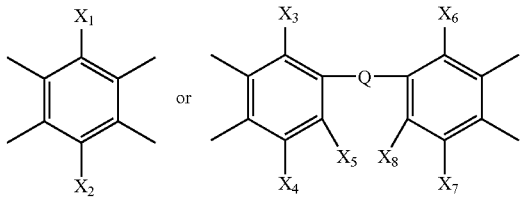

Y may be

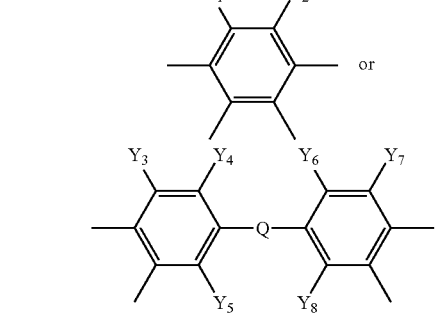

X1, X2, X3, X4, X5, X6, X7, Y1, Y2, Y3, Y4, Y5, Y6, Y7, and Y8 may independently be a hydrogen, a halogen, a C1-C30 alkyl group and alkyl halide group, and a C6-C30 aryl group and aryl halide group, for example;

Q may be a chemical bond or a group selected from —O—, —CO—, —SO2-, —S—, -(T)a-, —(OT)a-, -(TO)a-, and —(OTO)a- (where T may be an alkylene group substituted with at least one group including, but not limited to, a halogen and a C1-C10 alkyl halide group or an arylene group substituted with at least one group comprising a halogen and a C1-C10 alkyl halide group, a is an integer in the range of about 1 to about 10);

R1 and R2 may be independently a H or a monovalent organic group of Formula (2) below, with the proviso that both R1 and R2 are not H; and m may be an integer in the range of about 10 to about 1000:

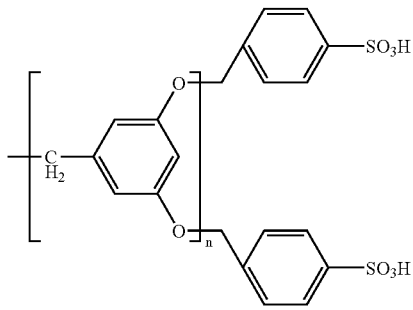

Formula 2 in which n may be an integer in the range of about 1 to about 5.

In Formula (1), X may be

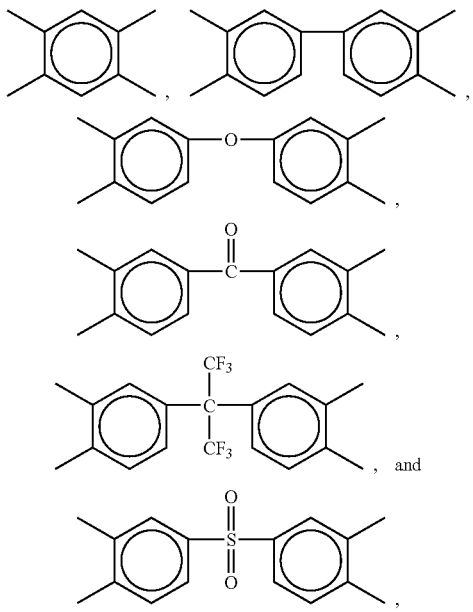

for example.

In Formula (1), Y may include

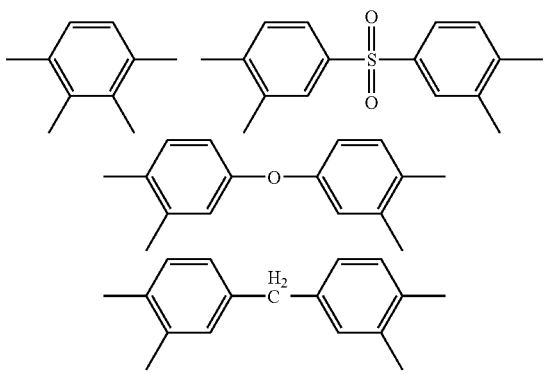

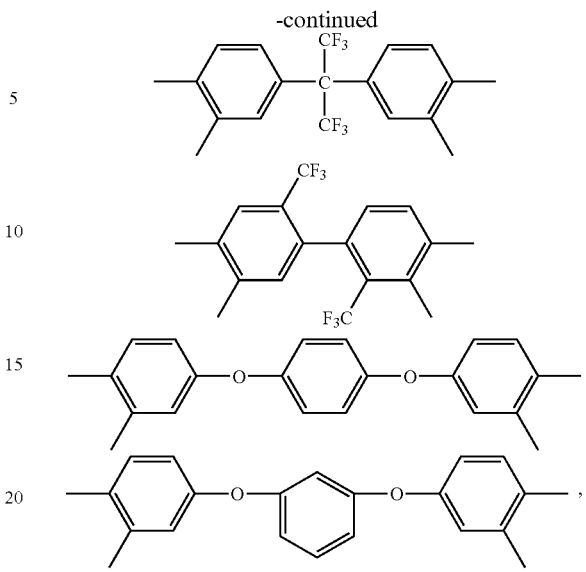

for example.

In a further embodiment, the polyimide having a high density sulfonic acid group in the branch structure will fully dissolve in various polar organic solvents and will coat evenly. Also, the polyimide has good hydrogen ionic conductivity due to a high density of a sulfonic acid at a side chain while retaining inherent good thermal resistance and mechanical properties.

The polyimide having a repeating unit of Formula (1) may include a reactive blocking group derived from a monoamine compound or monoanhydride compound having at least one carbon-carbon double bond at a terminal or at both terminals. The terminal reactive blocking groups may form cross links to each other during curing, thereby improving the physical properties of the final polymer membrane.

The reactive blocking group may be a reactive functional group produced by introducing the monoamine compound or the monoanhydride compound having a carbon-carbon double bond while preparing the polyimide in the manner described below. When monomers having the reactive functional group are introduced, the molecular weight of the polyimide may be controlled to the desired weight, and thus the properties of the polyimide may be optimized. Also, the viscosity of the final polyimide electrolyte solution may be lowered, and the physical is and chemical properties, i.e., thermal resistance, moisture resistance, chemical resistance, and mechanical strength of the electrolyte membrane may be greatly improved by cross linking the reactive blocking groups upon curing.

Examples of the monoamine compound or monoanhydride compound may include 5-norbornene-2,3-dicarboxylic anhydride (NDA), 3,4,5,6-tetrahydrophthalic anhydride, cis-1,2,3,6-tetrahydrophthalic anhydride, maleic anhydride (MA), 2,3-dimethylmaleic anhydride (DMMA), citraconic anhydride (CA), itaconic anhydride (IA), ethynyl aniline (EA), and maleic imide, with 5-norbornene-2,3-dicarboxylic anhydride (NDA), itaconic anhydride (IA), maleic anhydride (MA), or 2,3-dimethylmaleic anhydride (DMMA). The monoamine compound or monoanhydride compound may be used alone or in any combination. The amount of the reactive blocking group may be in a range of about 5 parts to about 50 parts by weight with respect to the total 100 parts by weight of the polyimide.

In an embodiment of the present invention, the polyimide having a repeating unit of Formula (1) above may be prepared in the following manner. A tetracarboxylic dianhydride compound of Formula (3) below, a diamine compound of Formula (4) below, and a monoamine compound or monoanhydride compound having at least one carbon-carbon double bond in a polar solvent to synthesize a predetermined polyamic acid may be reacted. Then the polyamic acid may be cured by heating the polyimide in a polar solvent to prepare a soluble polyhydroxyimide and then the polyhydroxyimide may be reacted with a compound of Formula (5) below in a polar solvent to introduce a dendrimer structure into a side chain. Finally, the reaction product may be reacted with a sulfonic acid compound to introduce a sulfonic acid group into a terminal of the side chain.

Formula 3

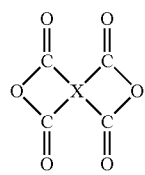

where X may be the same as in Formula (1).

Formula 4

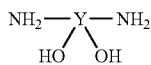

where Y may be the same as in Formula (1).

Formula 5

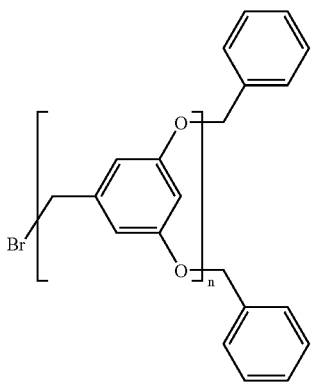

where n may be an integer in the range of about 1 to about 5.

In a more specific embodiment, the tetracarboxylic dianhydride compund of Formula (3), a dimamine comound of Formula (4), and a reactive blocking monomer may be reacted in a polar solvent at a temperature in the range of about 0° C. to about 10° C. for longer than about 4 hours to synthesize a predetermined polyamic acid. Then, the temperature may be raised to a range of about 120° C. to about 180° C. and the polyamic acid may be cured by heating for a time period in the range of about 2 hours to about 4 hours to prepare a soluble polyhydroxyimide. Thereafter, a hydroxy group of the soluble polyhydroxyimide may be reacted with the dendrimer compound of Formula (5) above in the presence of a polar solvent to introduce a dendrimer structure into a main chain of a polyimide. Then, the resultant may be sulfonated to introduce a sulfonic acid group into a terminal of a side chain.

Examples of the tetracarboxylic dianhydride of Formula (3), described above, may include, but are not limited to, pyromellitic dianhydride, 3,3,4,4-biphenyl tetracarboxylic dianhydride, 4,4-oxydiphthalic dianhydride, 3,3',4,4'-benzophenone tetracarboxylic dianhydride, 2,2-bis(3,4-benzenedicarboxylic anhydride)perfluoropropane, and 4,4-sulfonyldiphthalic dianhydride, with pyromellitic dianhydride, 3,3,4,4-biphenyl tetracarboxylic dianhydride, 4,4-oxydiphthalic dianhydride. The tetracarboxylic dianhydride may be used alone or in any combination thereof.

Examples of the diamine of Formula (4), described above, may include, for example, 1,3-diamino-4-dihydroxybenzene, 1,3-diamino-5-dihydroxybenzene, 3,3'-diamino-4,4'-dihydroxybiphenyl, 4,4-diamino-3,3'-dihydroxybiphenyl, 2,2-bis(3-amino-4-hydroxyphenyl)propane, bis(4-amino-3-hydroxyphenyl)sulfone, bis(3-amino-4-hydroxyphenyl)sulfone, bis(4-amino-3-hydroxyphenyl)sulfone, bis(3-amino-4-hydroxyphenyl)ether, bis(4-amino-3-hydroxyphenyl)ether, and 2,2-bis(3-amino-4-hydroxyphenyl)hexafluoropropane, with 2,2-bis(3-amino-4-hydroxyphenyl)hexafluoropropane being ideal. The diamine compound may be used alone or in any combination thereof.

Examples of the polar solvent used to prepare the polyimide may include N-methyl-2-phyrollidone, N,N'-dimethylacetoamide, dimethylformamide, dimethylsulfoxide, acetonitrile, γ-butyrolactone, phenol, toluene, and cyclohexane, for example. These solvents may be used alone or in any combination thereof.

Another embodiment of the present invention is directed to a polymer electrolyte prepared by curing the polyimide having a repeating unit of Formula (1) above. In a further embodiment, a polymer electrolyte may be prepared by curing a mixture of the polyimide compound having a repeating unit of Formula (1) and a polyamic acid having a repeating unit of Formula (6), depicted below, and may also include a reactive blocking group derived from a monoamine compound or monoanhydride compound having at least one carbon-carbon double bond at a terminal or at both terminals.

where X may be

Formula 6

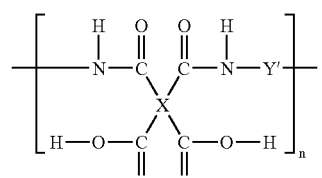

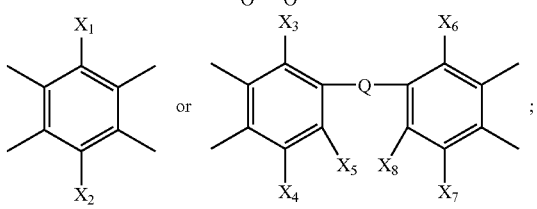

Y' may be

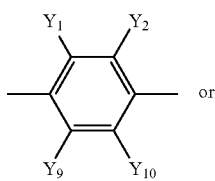

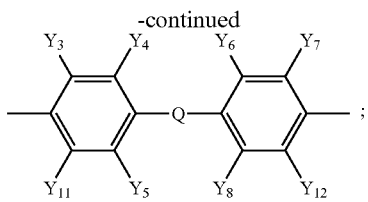

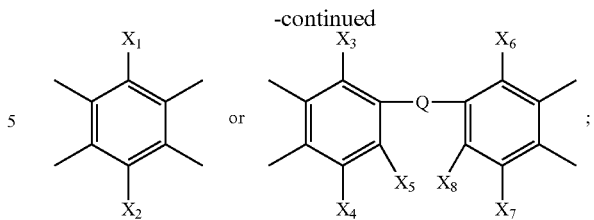

X1, X2, X3, X4, X5, X6, X7, X8, Y1, Y2, Y3, Y4, Y5, Y6, Y7, Y8, Y9, Y10, Y11, and Y12 may independently be selected from a hydrogen, a halogen, a C1-C30 alkyl group and alkyl halide group, and a C6-C30 aryl group and aryl halide group, for example;

Q may be a chemical bond or a group including, but not limited to, —O—, —CO—, —SO2-, —S—, -(T)a-, —(OT)a-, -(TO)a-, and —(OTO)a- (where T may be an alkylene group substituted with one or more of a halogen and a C1-C10 alkyl halide group or an arylene group substituted with one or more of a halogen and a C1-C10 alkyl halide group, a may be an integer in the range of about 1 to about 10); and n may be an integer in the range of about 10 to about 1000. Examples of X and Y' may be the same as those of X and Y described in Formula (1) above.

The polyamic acid may include a reactive blocking group at a terminal or at both terminals. The reactive blocking group is capable of improving the physical properties of the resultant electrolyte membrane due to the cross-links that form during the curing process between the terminal sulfonic acid structure of the polyimide and the polyamic acid terminal(s).

The reactive blocking group may be produced by introducing monomers having a reactive functional group, i.e., a monoamine compound or monoanhydride compound having a carbon-carbon double bond when preparing the polyamic acid. When monomers having the reactive functional group are introduced, the molecular weight of the polyamic acid may be easily controlled to the desired range. Also, the viscosity of a final polyamic acid solution may be lower, thereby improving the physical properties of the electrolyte membrane. The amount of the reactive blocking group used may be in the range of about 5 parts to about 50 parts by weight with respect to the total 100 parts by weight of the polyamic acid. In a specific embodiment, the polyamic acid may be used in combination with the polyimide, thereby resulting improving the mechanical properties of the electrolyte membrane. Examples of the monomer having the reactive functional group are the same as described above.

In another embodiment, a polymer electrolyte may be prepared by curing a mixture of the polyimide having a repeating unit of Formula (1) and a soluble polyhydroxyimide having a repeating unit of Formula (7), depicted below, and also including a reactive blocking group derived from a monoamine compound or monoanhydride compound having at least one carbon-carbon double bond at a terminal or at both terminals.

where X may

Formula 7

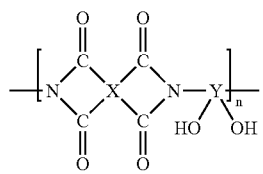

Y may be

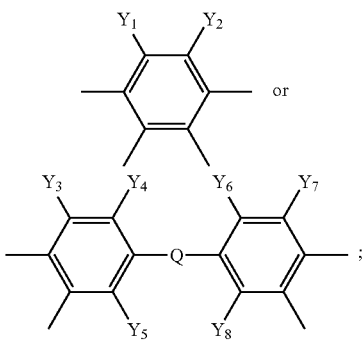

X1, X2, X3, X4, X5, X6, X7, X8, Y1, Y2, Y3, Y4, Y5, Y6, Y7, and Y8 may independently include, but are not limited to, a hydrogen, a halogen, a C1-C30 alkyl group and alkyl halide group, and a C6-C30 aryl group and aryl halide group, for example;

Q may be a chemical bond or a group including, for example, —O—, —CO—, —SO2-, —S—, -(T)a-, —(OT)a-, -(TO)a-, and —(OTO)a- (where T may be an alkylene group substituted with one or more of a halogen and a C1-C10 alkyl halide group or an arylene group substituted with one or more of a halogen and a C1-C10 alkyl halide group, a may be an integer in the range of about 1 to about 10); and m may be an integer in the range of about 10 to about 1000. Examples of X and Y may be the same as described above.

In a particular embodiment, the physical properties of the electrolyte membrane may be improved when the soluble polyhydroxyimide of Formula (7), including the terminal reactive blocking group, is mixed with the polyimide having a repeating unit of Formula (1). These improvements in the properties of the electrolyte membrane are observed due to the formation of cross links between terminals of the compounds upon curing.

In a further embodiment, the curing process may be accomplished by thermally treating the polyimide under an inert gas or vacuum at a temperature in the range of about 100° C. to about 300° C. for a time period in the range of about 0.5 hours to about 5 hours. The reactive blocking groups positioned at terminals of the polyimides form cross-links upon curing, thereby producing a polymer electrolyte having good mechanical properties. The amount of the reactive blocking group used may be in the range of about 5 parts to about 50 parts by weight with respect to the total 100 parts by weight of the soluble polyhydroxyimide. Additionally, the mechanical properties of the electrolyte membrane may be further improved when the polyhydroxyimide is used in combination with the polyamide.

When preparing the polymer electrolyte, if the weight of the polyimide having a repeating unit of Formula (1) and having a sulfonic acid positioned at a side chain, is represented by A and the weight of the polyamic acid having a repeating unit of Formula (6) or the soluble polyhydroxyimide having a repeating unit of Formula (7) is represented by B, the ratio of the weight of the polyimide to the total weight of a mixture of the soluble polyhydroxyimide or the polyamic acid and the polyimide A/(A+B) is in the range of about 0.01 to about 0.95, and ideally in the range of about 0.3 to about 0.7. The physical properties, thermal resistance, moisture absorption, and hydrogen ionic conductivity of a film may be controlled by the ratio.

The polymer electrolyte of the present invention may be applied to all types of fuel cells, for example, to polymer electrolyte membrane fuel cells (PEMFCs) using hydrogen as fuel, and to direct methanol fuel cells (DMFCS) using a mixture of methanol vapor and water vapor or an aqueous methanol solution as fuel. In particular, the polymer electrolyte according to the present invention may be applied to DMFCs using an aqueous methanol solution.

The present invention provides a fuel cell including a cathode where oxygen is reduced, an anode where the fuel is oxidized, and an electrolyte interposed between the cathode and the anode, wherein the electrolyte is the polymer electrolyte according to the present invention. The cathode may include a catalyst layer that catalyzes the reduction of oxygen. The catalyst layer may include a catalyst and a polymer having cation exchange groups. An example of the catalyst is a carbon supported Pt (Pt/C) catalyst.

The anode may include a catalyst layer that catalyzes the oxidation of fuel, such as hydrogen, natural gas, methanol, ethanol, for example. The catalyst layer may include a catalyst and a polymer having cation exchange groups. Specific examples of the catalyst may include a Pt/C catalyst, and a carbon supported Pt—Ru catalyst. In particular, the carbon supported Pt—Ru catalyst is useful when an organic fuel other than hydrogen is directly supplied to the anode.

The catalyst may be in the cathode and the anode may include catalytic metal particles and a catalyst carrier. As the catalyst carrier, solid powder, such as carbon powder, having conductivity and having micropores capable of supporting the catalytic metal particles may be used. Examples of the carbon powder may include carbon black, Ketzen black, acetylene black, activated carbon powder, carbon nanofiber powder, and mixtures thereof.

The catalyst layers of the cathode and the anode, respectively, may be in contact with the polymer electrolyte. Each of the cathode and the anode may further include a gas diffusion layer in addition to the catalyst layer. The gas diffusion layer may be composed of porous material with electro-conductivity. The gas diffusion layer may act as a current collector and as an entry/exit path of reactants and products. As the gas diffusion layer, carbon paper may be used. In a specific embodiment, the carbon paper may be waterproof, and more specifically a waterproof carbon paper having a waterproof carbon black layer. The waterproof carbon paper may comprise a hydrophobic polymer, such as polytetrafluoroethylene (PTFE). The hydrophobic polymer may be sintered. The gas diffusion layer may be waterproofed to ensure the entry/exit path of polar liquid reactants and gaseous reactants. In the waterproof carbon paper having the waterproof carbon black layer, the waterproof carbon black layer may include carbon black and the hydrophobic polymer, such as PTFE, as a hydrophobic binder. The waterproof carbon black layer may be applied to a surface of the waterproof carbon paper, as described above. The hydrophobic polymer of the waterproof carbon black layer may be sintered. The cathode and the anode may be manufactured through various known methods known by those skilled in the art without restriction.

In a particular embodiment, the fuel supplied to the fuel cell may be hydrogen, natural gas, methanol, and ethanol, for example. Liquid fuel including polar organic fuel and water may be supplied to the anode. Examples of the polar organic fuel may include methanol, and ethanol. The liquid fuel may be an aqueous methanol solution.

EXAMPLES

Specific Example 1

Synthesis of First-Generation Dendrimer C2-Br:

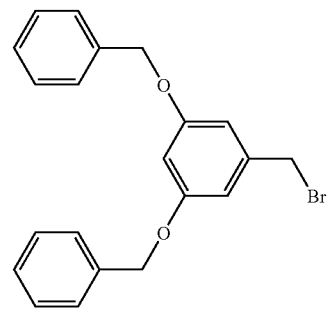

65 g of benzyl bromide, 25 g of 3,5-dihydroxybenzylalcohol, 50 g of K2CO3, and 9.5 g of 18-crown-6 were dissolved in acetone and reacted at about 65° C. for about 24 hours. The reaction mixture was cooled to room temperature, the solvent was evaporated, and then the residue was extracted with ethyl acetate. After evaporating the solvent, the resultant was recrystallized with ether and hexane to obtain 37 g of first-generation dendrimer C2-OH. The solid was dissolved in benzene, and then 12 g of PBr3 was slowly added to the solution while maintaining the temperature at about 0° C. After stirring the mixture at room temperature for 2 additional hours, benzene was evaporated and the residue was extracted with ethyl acetate. After evaporating the solvent, the obtained solid was recrystallized with toluene and ethanol to obtain 35 g of first-generation dendrimer C2-Br.

The following peaks were obtained through NMR spectroscopy: 1H NMR(CDCl3) δ4.41 (s, 2H, CH2Br), 4.97 (s, 4H, ArCH20), 5.04 (s, 8H, PhCH20), 6.53 (t. 1H, ArH), 6.59 (t. 2H, ArH), 6.63 (d, 2H, ArH), 6.68 (d, 4H, ArH), 7.30-7.44 (m, 20H, PhH).

Synthesis of Second-Generation Dendrimer C4-Br:

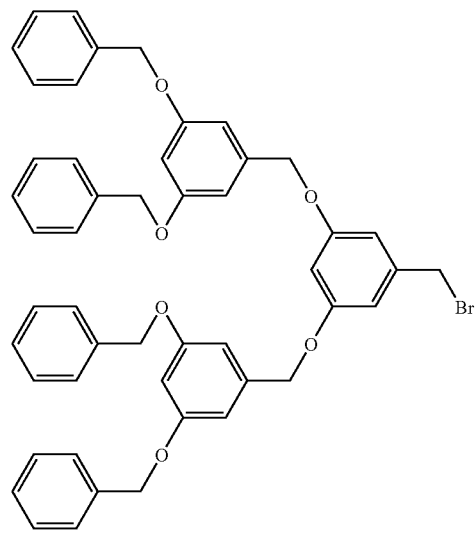

24 g of the first-generation dendrimer C2-Br prepared above, 4.6 g of 3,5-dihydroxybenzylalcohol, 9 g of K2CO3, and 1.7 g of 18-crown-6 were dissolved in acetone and reacted at about 65° C. for about 24 hours. The reaction mixture was cooled to room temperature, the solvent was evaporated, and then the residue was extracted with ethyl acetate. After evaporating the solvent, the resultant was recrystallized with toluene and ethanol to obtain 18 g of the second-generation dendrimer C4-OH. The solid was dissolved in benzene, and then 2.6 g of PBr3 was slowly added to the solution while maintaining the temperature at about 0° C. After stirring the mixture at room temperature for further 2 hours, benzene was evaporated and the residue was extracted with ethyl acetate. After evaporating the solvent, the obtained solid was recrystallized with toluene and ethanol to obtain 11 g of the second-generation dendrimer C4-Br.

The following peaks were obtained through NMR spectroscopy: 1H NMR(CDCl3) δ4.36 (s, 2H, CH2Br), 4.93 (s, 4H, ArCH2O), 4.95 (s, 8H, ArCH2O), 5.00 (s, 16H, PhCH2O), 6.52 (m. 3H, ArH), 6.55 (t. 4H, ArH), 6.60 (d, 2H, ArH), 6.65 (d, 8H, ArH), 7.27-7.41 (m, 40H, PhH).

Specific Example 2

Synthesis of a Soluble Polyhydroxyimide Resin 10.99 g of 2,2-bis(3-amino-4-hydroxyphenyl)hexafluoropropane and 60 g of N-methyl-2-phyrollidone (NMP) were sequentially added into a 1 L round-bottom flask and thoroughly dissolved by slowly stirring. Then, 8.38 g of 4,4'-oxydiphthalic anhydride (ODPA) and 0.59 g of maleic anhydride were slowly added while maintaining the temperature of the flask ranging from about 0° C. to about 5° C. The mixture was stirred at room temperature for about 16 hours, and then 30 g of toluene was added thereto. The solution was refluxed using a dean-stark distillation at about 170° C. for about 3 hours, thereby completing the reaction. The obtained reaction solution was cooled to room temperature, and then solidified by slowly pouring into a ¼ mixture of methanol and water. The solid was filtered and dried in a vacuum dry oven at about 40° C. for about 24 hours to obtain 18 g of a soluble polyimide resin having the following structure.

As seen from 1H NMR spectrum of FIG. 1, a hydrogen peak attributed to a hydroxy group was observed at 10.47 ppm and a hydrogen peak attributed to a phenyl group was observed between 7.07 and 8.07 ppm.

Synthesis of Polyimide Having a Branch Structure:

In a 1 L round-bottom flask, 20 g of the soluble polyhydroxyimide resin powder prepared above was dissolved in 100 g of NMP and cooled on ice, and then 4.5 g of triethylamine (TEA) was added while maintaining the temperature in a range of about 0° C. to about 5° C. After stirring for about 10 minutes, 17.2 g of C2-Br obtained in Example 1 was slowly added. The solution was stirred and reacted for 3 hours, and then triethylammonium chloride was filtered and removed while being maintained at a low temperature. The filtrate was slowly poured into a ½ mixture of methanol and distilled water, which was being stirred at high speed, to precipitate a fine, white solid. Only the fine, white solid was separated by filtering, and then washed with distilled water. The solid was dried in a vacuum oven at about 40° C. for about 36 hours to obtain 20 g of polyimide having a branch structure in a white powder state.

Figure 2:
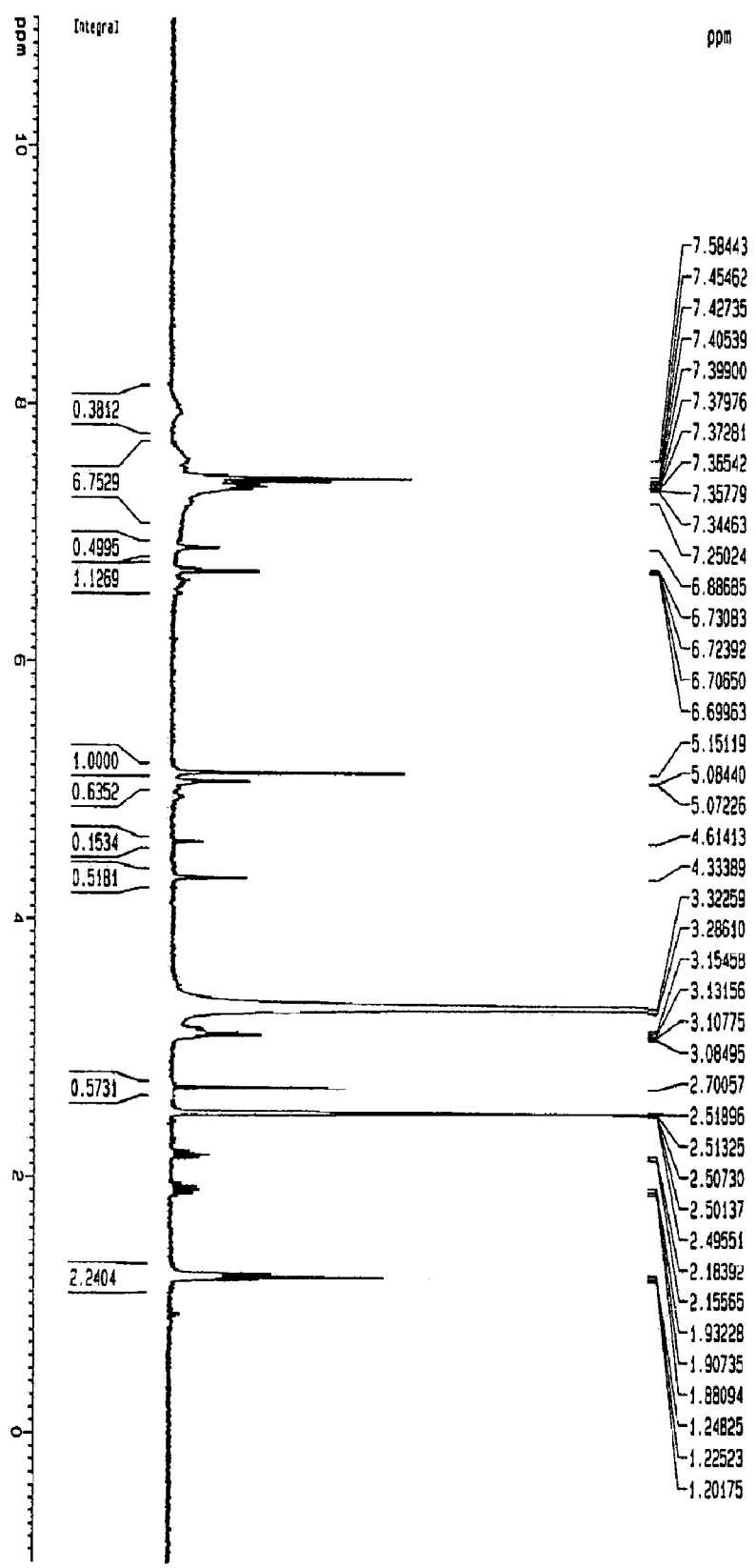
FIG. 2 is an NMR spectrum of a polyimide having a branch structure, prepared in Example 3.

As seen from 1H NMR spectrum of FIG. 2, a hydrogen peak at 10.47 ppm attributed to OH disappeared and a peak attributed to CH2 was observed at 5.15 ppm, indicating that a branch structure was introduced into the polyhydroxyimide.

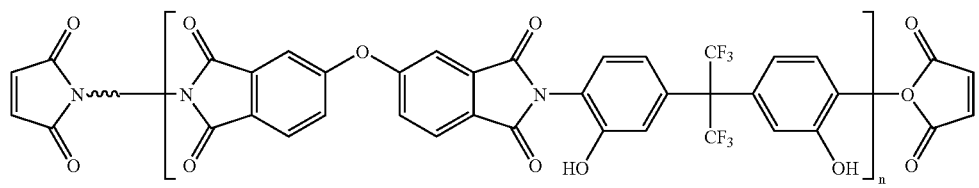

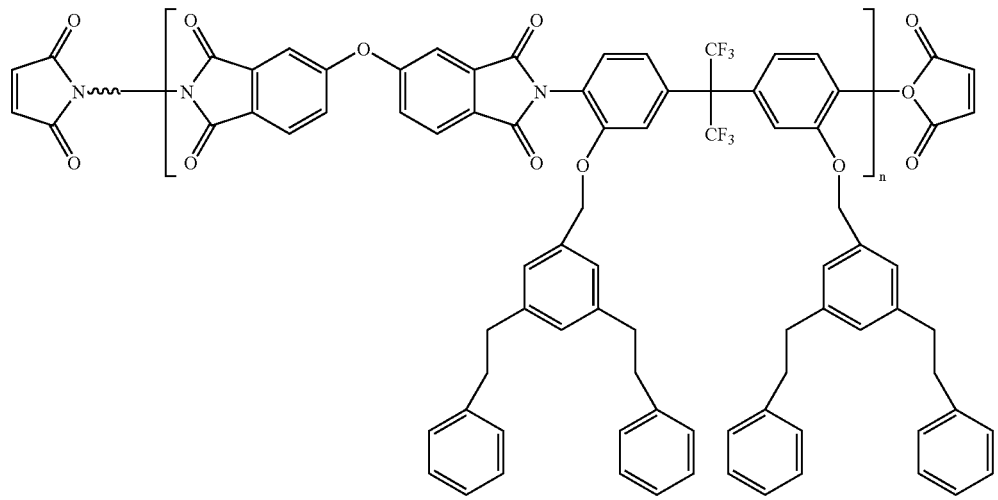

Sulfonation of Polyimide:

20 g of the polyimide having a branch structure, which had been obtained above, was dissolved in H2SO4 (20% SO3) and stirred at about 110° C. for about 6 hours. The reactant was cooled to room temperature, and then 500 ml of diethyl ether was added to form a precipitate. The precipitate was filtered and dissolved in water, and then poured into a dialysis membrane and purified to obtain a sulfonated polyimide polymer.

Synthesis of Polyamic Acid:

40.05 g of 4,4'-dimaminodiphenylether (ODA) and 239 g of NMP were sequentially added to a 1 L round-bottom flask reactor and thoroughly dissolved by slowly stirring. Then, 55.8 g of 4,4'-oxydiphthalic anhydride (ODPA) was slowly added and dissolved by stirring. The mixture was reacted by stirring for about 2 hours, and then 6.57 g of NDA was slowly added and further stirred at room temperature for about 16 hours to obtain polyamic acid in a solution state.

Preparation of a Polymer Electrolyte Membrane:

The sulfonated polyimide prepared above was dissolved in NMP and mixed with polyamic acid at a ratio of about 1:1.

Then, triethylamine (TEA) was added to the mixture in an amount of about 10 parts by weight with respect to 100 parts by weight of the solid polymer compound. Thereafter, the resultant was spin-coated on a wafer. The coated wafer was heated in a oven at about 150° C. for about 30 minutes then at about 250° C. for about 1 hour to prepare a polymer electrolyte membrane. The prepared membrane was immersed in a 2% aqueous fluoric acid solution for about 2 hours to release a film. The released film was immersed in a 1M aqueous hydrochloride solution at about 60° C. for about 6 hours and washed with distilled water.

Evaluation:

The mechanical strength of the prepared membrane was measured using UTM. The analysis revealed that an enlongation of 10%, modulus of 1.5 Gpa, and tensile strength of 60 Mpa were obtained.

Also, hydrogen ionic conductivity was measured using an impedance meter, and the analysis showed that the ionic conductivity of 0.025 S/cm at 60° C. under a humidity of 50%, 0.074 S/cm at 80° C. under humidity of 50%, and 0.076 S/cm at 100° C. under a humidity of 50% were obtained.

Specific Example 3

Synthesis of a Soluble Polyhydroxyimide Resin:

14.65 g of 2,2-bis(3-amino-4-hydroxyphenyl)hexafluoropropane and 70 g of NMP were sequentially added into a 1 L round-bottom flask and thoroughly dissolved by slowly stirring. Then, 16.0 g of 4,4'-(hexafluoroisopropylidene)diphthalic anhydride (6FDA) was slowly added while keeping the flask at room temperature. The mixture was stirred for about 2 hours, and then 0.78 g of maleic anhydride was added and further stirred at room temperature for about 16 hours. 30 g of toluene was added to the solution and refluxed using a deanstark distillation at about 170° C. for about 3 hours. The obtained reaction solution was cooled and then solidified by slowly pouring it into a mixture of methanol and water (1:4). The solid was filtered and dried in a vacuum oven at about 40° C. overnight to obtain 45 g of white resin powder having the following structure.

Figure 3:
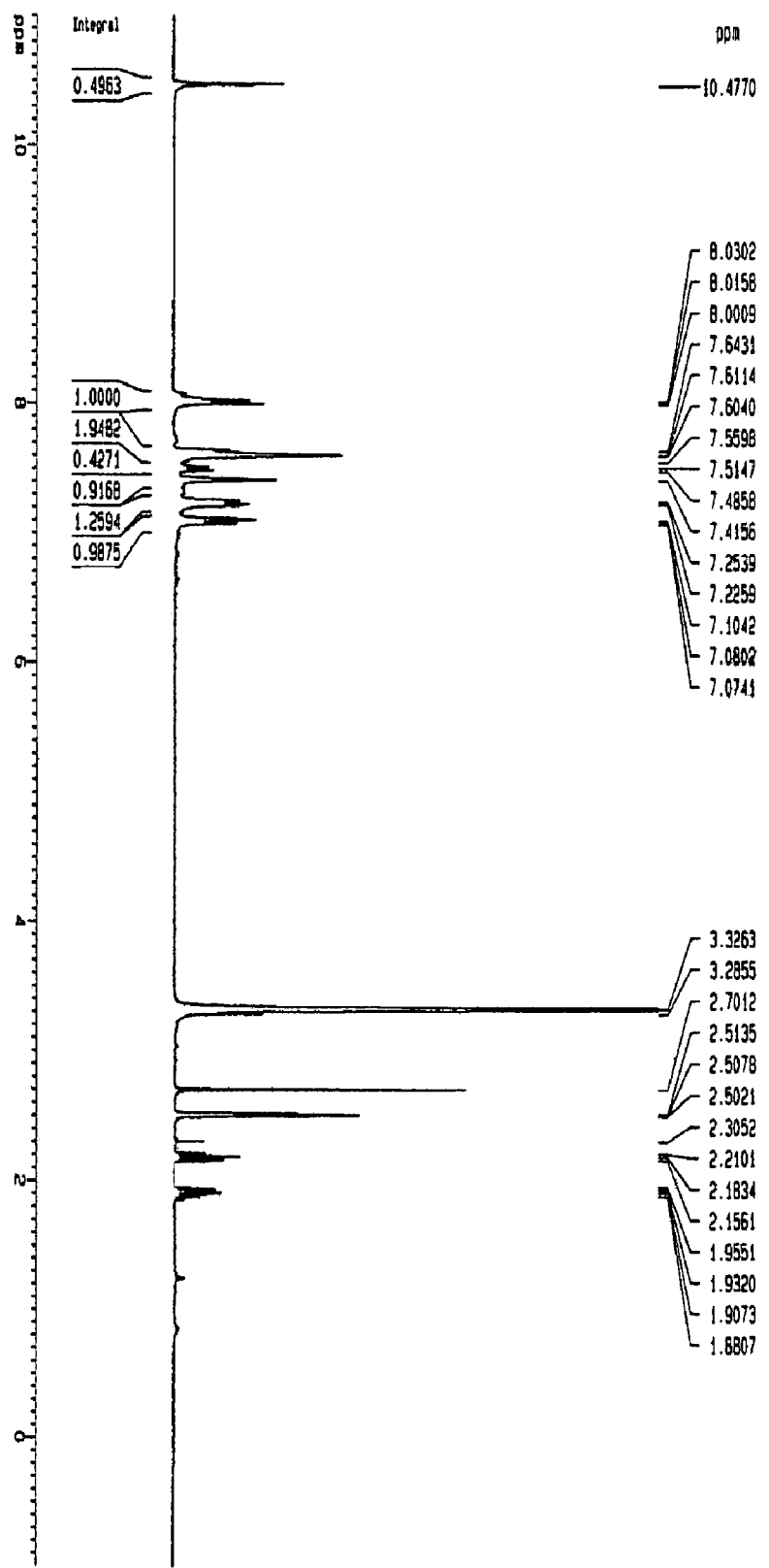
FIG. 3 is an NMR spectrum of a soluble polyhydroxyimide prepared in Example 3.

As seen from 1H NMR spectrum of FIG. 3, a hydrogen peak attributed to a hydroxy group was observed at 10.47 ppm and a hydrogen peak attributed to a phenyl group was observed between 7.07 and 8.07 ppm.

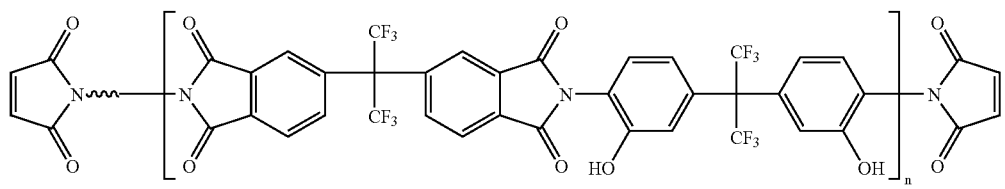

Synthesis of Polyimide Having a Branch Structure:

In a 1 L round-bottom flask, 19.6 g of the soluble polyhydroxyimide resin powder obtained above was dissolved in 100 g of NMP and cooled on ice, and then 4.02 g of triethylamine while maintaining the temperature at a range of about 0° C. to about 5° C. After stirring for 10 minutes, 15.2 g of C2-Br obtained in Example 1 was slowly added. The solution was stirred and reacted for about 3 hours, and then triethylammonium chloride was filtered and removed while maintaining a low temperature. The filtrate was slowly poured into a ½ mixture of methanol and distilled water, which was being stirred at high speed, to precipitate a fine, white solid. The fine, white solid was filtered and then washed with distilled water. The solid was dried in a vacuum oven at about 40° C. for about 36 hours to obtain 21 g of polyimide having the following structure in a white powder form.

Figure 4:
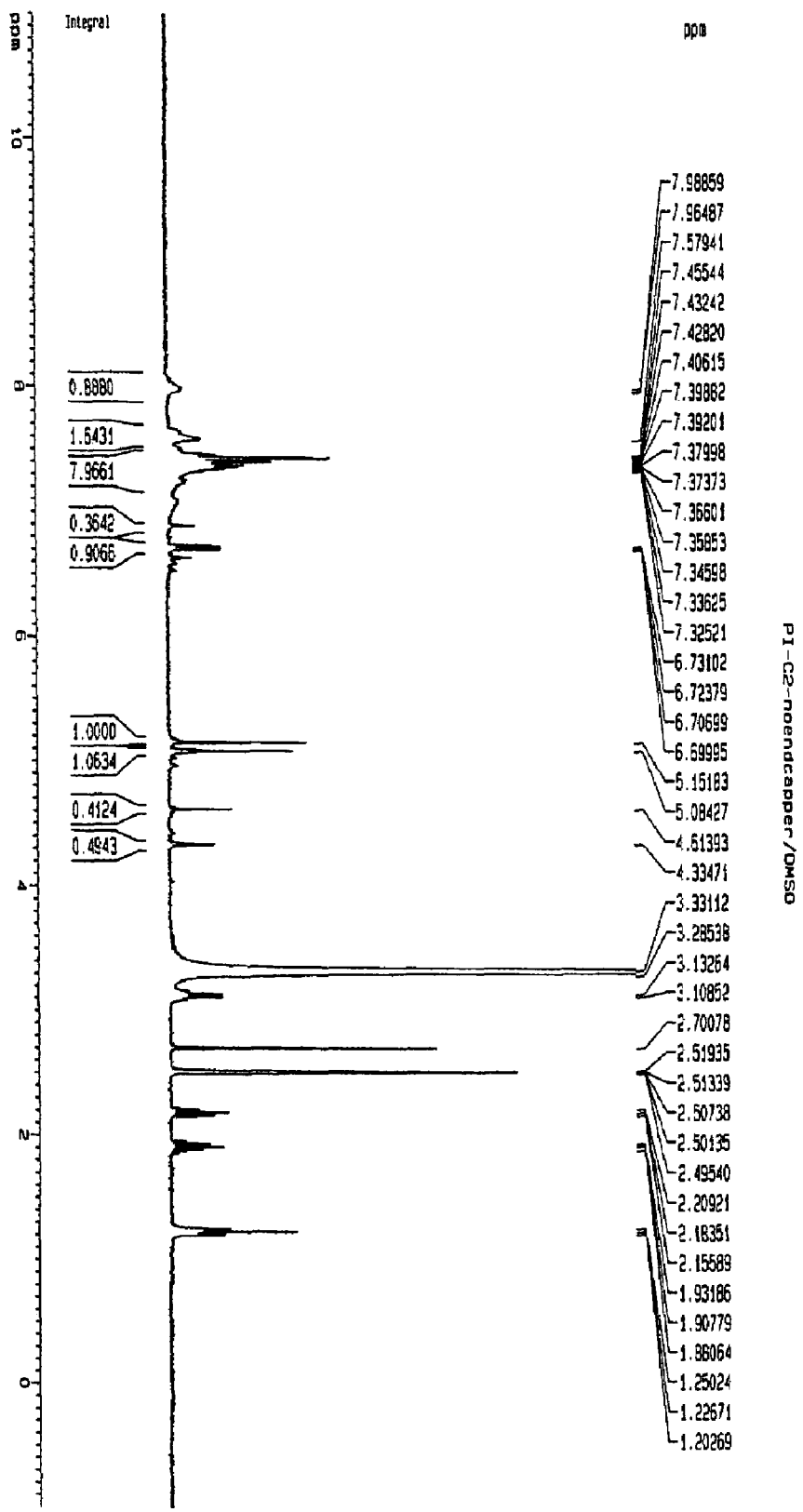
FIG. 4 is an NMR spectrum of a polyimide having a branch structure, prepared in Example 3.

As seen from 1H NMR spectrum of FIG. 4, a hydrogen peak at 10.47 ppm attributed to OH disappeared and a peak attributed to CH2 was observed at 5.15 ppm, indicating that a branch structure was introduced into the polyhydroxyimide.

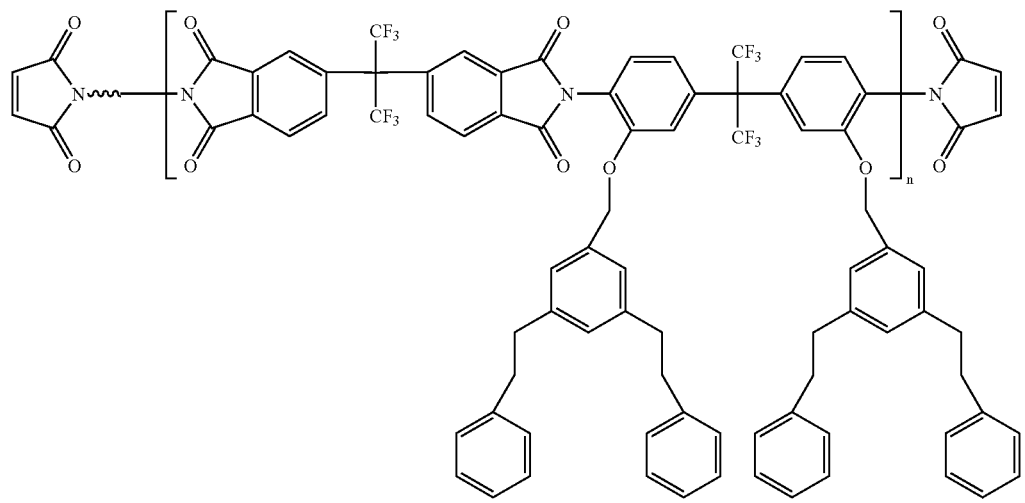

Sulfonation of Polyimide:

20 g of the polyimide having a branch structure, which had been obtained above, was dissolved in $H_2SO_4$ (20% SO3) and stirred at about 110° C. for about 6 hours. The reactant was cooled to room temperature, and then 500 ml of diethyl ether was added thereto to form a precipitate. The precipitate was filtered and dissolved in water, and then poured into a dialysis membrane and purified to obtain a sulfonated polyimide polymer.

Preparation of a Polymer Electrolyte Membrane:

The sulfonated polyimide prepared above was dissolved in NMP and mixed with the polyamic acid prepared in Example 2 at a ratio of about 1:1. Then, triethylamine (TEA) was added to the mixture in an amount of about 10 parts by weight with respect to 100 parts by weight of the solid polymer compound. Thereafter, the resultant was spin coated on a wafer. The coated wafer was heated in an oven at about 150° C. for about 30 minutes then at about 250° C. for about 1 hour to prepare a polymer electrolyte membrane. The prepared membrane was immersed in a 2% aqueous fluoric acid solution for about 2 hours to release a film. The released film was immersed in a 1M aqueous hydrochloride solution at about 60° C. for about 6 hours and washed with distilled water.

Evaluation:

The mechanical strength of the prepared membrane was measured using UTM. The analysis showed that an enlongation of 8%, modulus of 1.3 Gpa, and tensile strength of 52 Mpa were obtained. Also, hydrogen ionic conductivity was measured using an impedance meter. The analysis showed that an ionic conductivity of 0.020 S/cm at 60° C. under a humidity of 50%, 0.066 S/cm at 80° C. under a humidity of 50%, and 0.007 S/cm at 100° C. under a humidity of 50% were obtained.

According to the present invention, a substituent having a terminal sulfonic acid group may be introduced into a side chain of polyimide having good mechanical properties and thermal resistance, thereby obtaining high ionic conductivity. Also, the polymers may be cross linked through terminal reactive blocking groups, thereby obtaining a polymer electrolyte which does not exhibit swelling and has high ionic conductivity even under low humidity. Accordingly, a fuel cell having improved electrical and mechanical properties can be provided using the polymer electrolyte.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer electrolyte prepared by curing a polyimide, the polyimide comprising:
   a repeating unit of

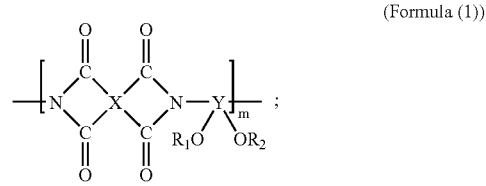

(Formula (1))

and a reactive blocking group derived from a monoamine compound or monoanhydride compound having at least one carbon-carbon double bond at a terminal or at both terminals:

wherein X is

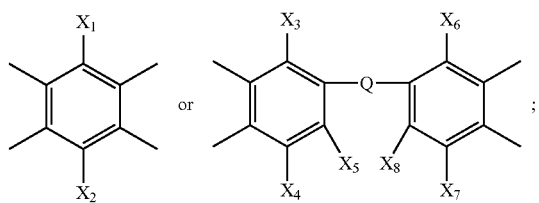

Y is

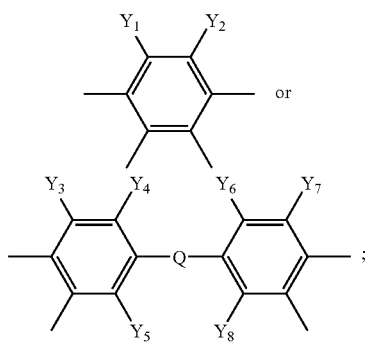

X1, X2, X3, X4, X5, X6, X7, X8, Y1, Y2, Y3, Y4, Y5, Y6, Y7, and Y8 are independently selected from the group consisting of a hydrogen, a halogen, a C1-C30 alkyl group and alkyl halide group, and a C6-C30 aryl group and aryl halide group;

Q is a chemical bond or a group selected from the group consisting of —O—, —CO—, —SO2-, —S—, -(T)a-, —(OT)a-, -(TO)a-, and —(OTO)a- (where T is an alkylene group substituted with at least one selected from a halogen and a C1-C10 alkyl halide group or an arylene group substituted with at least one selected from a halogen and a C1-C10 alkyl halide group, a is an integer in the range of 1 to 10);

R1 and R2 are independently H or a monovalent organic group of

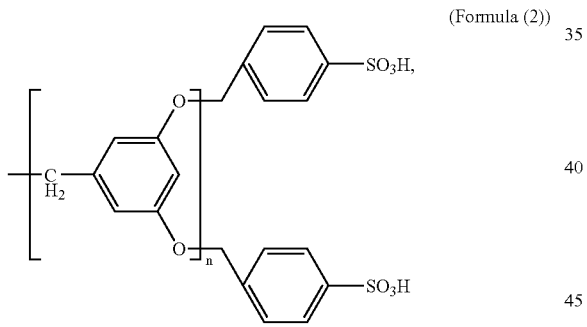
(Formula (2))

with the proviso that R1 and R2 are not both H;

m is an integer in the range of 10 to 1000; and n is an integer in the range of 1 to 5.

2. The polymer electrolyte of claim 1, wherein the curing step is performed by heating the polyimide under an inert gas or vacuum at a temperature in the range of 100° C. to 300° C. for a time period in the range of 0.5 hours to 5 hours.

3. A polymer electrolyte prepared by curing a mixture of a polyimide comprising a repeating unit of

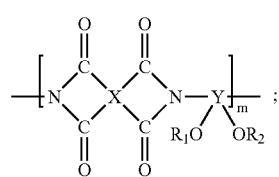
(Formula (1))

and a reactive blocking group derived from a monoamine compound or monoanhydride compound having at least one carbon-carbon double bond at a terminal or at both terminals;

wherein X is

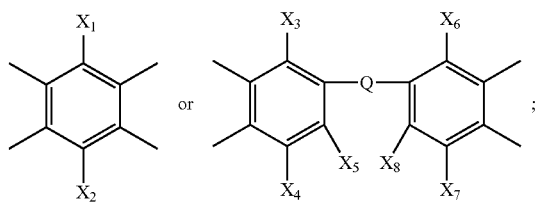

Y is

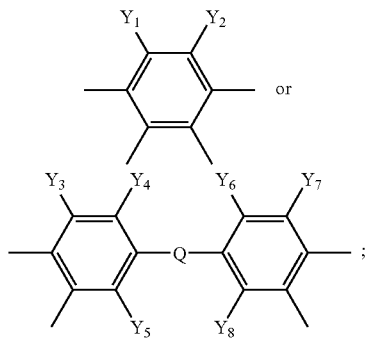

X1, X2, X3, X4, X5, X6, X7, X8, Y1, Y2, Y3, Y4, Y5, Y6, Y7, and Y8 are independently selected from the group consisting of a hydrogen, a halogen, a C1-C30 alkyl group and alkyl halide group, and a C6-C30 aryl group and aryl halide group;

Q is a chemical bond or a group selected from the group consisting of —O—, —CO—, —SO2-, —S—, -(T)a-, —(OT)a-, -(TO)a-, and —(OTO)a- (where T is an alkylene group substituted with at least one selected from a halogen and a C1-C10 alkyl halide group or an arylene group substituted with at least one selected from a halogen and a C1-C10 alkyl halide group, a is an integer in the range of 1 to 10);

R1 and R2 are independently H or a monovalent organic group of

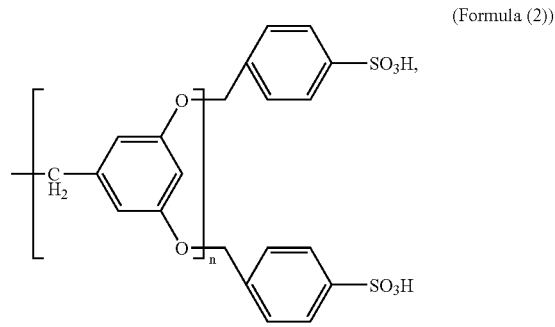
(Formula (2))

with the proviso that R1 and R2 are not both H;

m is an integer in the range of 10 to 1000; and n is an integer in the range of 1 to 5, and a polyamic acid having a repeating unit of

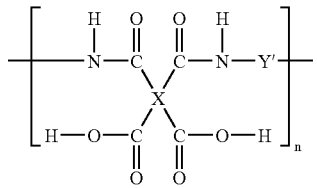

(Formula (6)) and comprising a reactive blocking group derived from a monoamine compound or monoanhydride compound having at least one carbon-carbon double bond at a terminal or at both terminals;

wherein X is

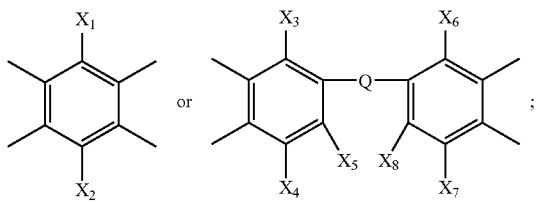

Y' is

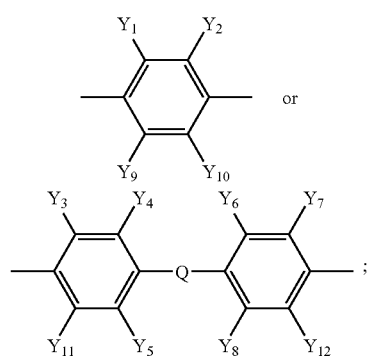

X1, X2, X3, X4, X5, X6, X7, X8, Y1, Y2, Y3, Y4, Y5, Y6, Y7, and Y8, Y9, Y10, Y11, and Y12 are independently selected from the group consisting of a hydrogen, a halogen, a C1-C30 alkyl group and alkyl halide group, and a C6-C30 aryl group and aryl halide group;

Q is a chemical bond or a group selected from the group consisting of —O—, —CO—, —SO2-, —S—, -(T)a-, —(OT)a-, -(TO)a-, and —(OTO)a- (where T is an alkylene group substituted with at least one selected from a halogen and a C1-C10 alkyl halide group or an arylene group substituted with at least one selected from a halogen and a C1-C10 alkyl halide group, a is an integer in the range of 1 to 10); and n is an integer in the range of 10 to 1000.

4. The polymer electrolyte of claim 3, wherein the curing step is performed by heating the polyimide under an inert gas or vacuum at a temperature in the range of 100° C. to 300° C. for a time period in the range of 0.5 hours to 5 hours.

5. The polymer electrolyte of claim 3, wherein an amount of the reactive blocking group is in the range of 5 parts to 50 parts by weight with respect to 100 parts by weight of the polyamic acid.

6. A polymer electrolyte prepared by curing a mixture of a polyimide and a soluble polyhydroxyimide having a repeating unit of

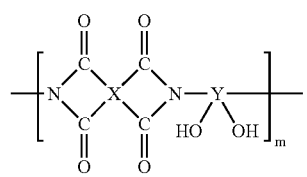

(Formula (7))

and comprising a reactive blocking group derived from a monoamine compound or monoanhydride compound having at least one carbon-carbon double bond at a terminal or at both terminals;

wherein X is

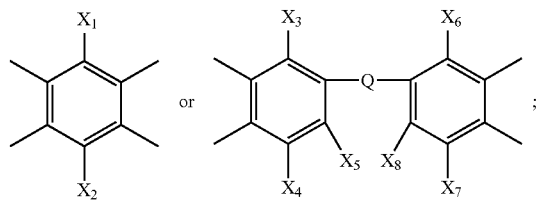

Y is

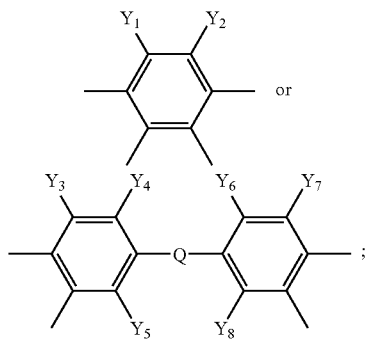

X1, X2, X3, X4, X5, X6, X7, X8, Y1, Y2, Y3, Y4, Y5, Y6, Y7, and Y8 are independently selected from the group consisting of a hydrogen, a halogen, a C1-C30 alkyl group and alkyl halide group, and a C6-C30 aryl group and aryl halide group;

Q is a chemical bond or a group selected from the group consisting of —O—, —CO—, —SO2-, —S—, -(T)a-, —(OT)a-, -(TO)a-, and —(OTO)a- (where T is an alkylene group substituted with at least one selected from a halogen and a C1-C10 alkyl halide group or an arylene group substituted with at least one selected from a halogen and a C1-C10 alkyl halide group, a is an integer in the range of 1 to 10); and m is an integer in the range of 10 to 1000, the polyimide comprising:
a repeating unit of

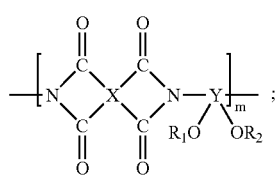
(Formula (1))

and
a reactive blocking group derived from a monoamine compound or monoanhydride compound having at least one carbon-carbon double bond at a terminal or at both terminals:
wherein X is

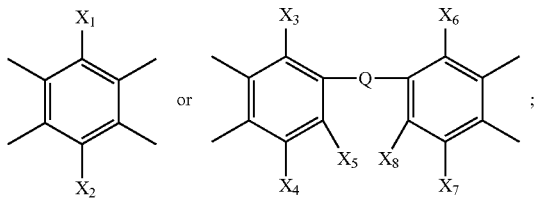

Y is

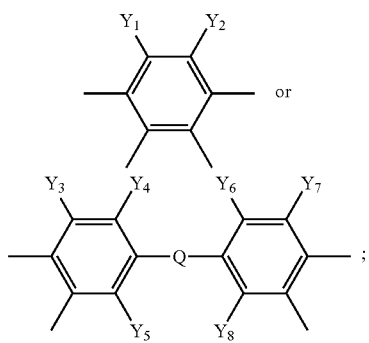

X1, X2, X3, X4, X5, X6, X7, X8, Y1, Y2, Y3, Y4, Y5, Y6, Y7, and Y8 are independently selected from the group consisting of a hydrogen, a halogen, a C1-C30 alkyl group and alkyl halide group, and a C6-C30 aryl group and aryl halide group;

Q is a chemical bond or a group selected from the group consisting of —O—, —CO—, —SO2-, 13 S—, -(T)a-, —(OT)a-, -(TO)a-, and —(OTO)a- (where T is an alkylene group substituted with at least one selected from a halogen and a C1-C10 alkyl halide group or an arylene group substituted with at least one selected from a halogen and a C1-C10 alkyl halide group, a is an integer in the range of 1 to 10);

R1 and R2 are independently H or a monovalent organic group of

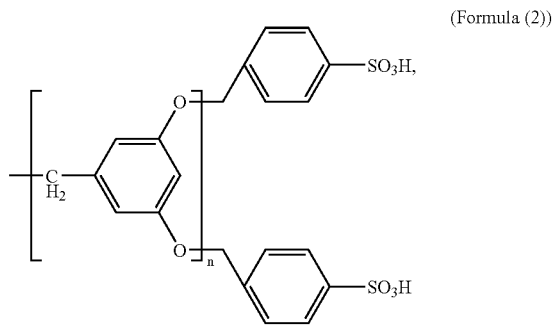
(Formula (2))

with the proviso that R1 and R2 are not both H;
m is an integer in the range of 10 to 1000; and
n is an integer in the range of 1 to 5.

7. The polymer electrolyte of claim 6, wherein the curing step is performed by heating the polyimide under an inert gas or vacuum at a temperature in the range of 100° C. to 300° C. for a time period in the range of 0.5 hours to 5 hours.

8. The polymer electrolyte of claim 6, wherein an amount of the reactive blocking group is in the range of 5 parts to 50 parts by weight with respect to 100 parts by weight of the soluble polyhydroxyimide.

9. The polymer electrolyte of claim 6, wherein if a weight of the polyimide of is represented by A and a weight of the polyamic acid is represented by B, the polyimide and the polyamic acid are mixed at a ratio A/(A+B) in the range of 0.1 to 0.9.

10. The polymer electrolyte of claim 6, wherein if a weight of the polyimide of is represented by A and a weight of the soluble polyhydroxyimide is represented by B, the polyimide and the soluble polyhydroxyimide are mixed at a ratio A/(A+B) in the range of 0.1 to 0.9.

11. A fuel cell comprising the polymer electrolyte of claim 1.

12. A fuel cell comprising the polymer electrolyte of claim 3.

13. A fuel cell comprising the polymer electrolyte of claim 6.

\* \* \* \* \*